US012056849B2

(12) United States Patent
Lukác et al.

(10) Patent No.: US 12,056,849 B2
(45) Date of Patent: Aug. 6, 2024

(54) NEURAL NETWORK FOR IMAGE STYLE TRANSLATION

(71) Applicants: Adobe Inc., San Jose, CA (US); Czech Technical University in Prague, Prague (CZ)

(72) Inventors: Michal Lukác, Boulder Creek, CA (US); Daniel Sýkora, Prague (CZ); David Futschik, Liberec (CZ); Zhaowen Wang, San Jose, CA (US); Elya Shechtman, Seattle, WA (US)

(73) Assignees: Adobe Inc., San Jose, CA (US); CZECH TECHNICAL UNIVERSITY IN PRAGUE, Prague (CZ)

( * ) Notice: Subject to any disclaimer, the term of this patent is extended or adjusted under 35 U.S.C. 154(b) by 375 days.

(21) Appl. No.: 17/466,711

(22) Filed: Sep. 3, 2021

(65) Prior Publication Data

US 2023/0070666 A1 Mar. 9, 2023

(51) Int. Cl.
 *G06T 5/50* (2006.01)
 *G06F 18/214* (2023.01)

(52) U.S. Cl.
 CPC .............. *G06T 5/50* (2013.01); *G06F 18/214* (2023.01); *G06T 2207/10016* (2013.01); *G06T 2207/20081* (2013.01); *G06T 2207/20084* (2013.01)

(58) Field of Classification Search
 CPC ......... G06T 11/001; G06T 11/00; G06T 5/50; G06T 15/02; G06T 7/40;
 (Continued)

(56) References Cited

U.S. PATENT DOCUMENTS

2020/0035010 A1* 1/2020 Kim ....................... G06T 13/40
2021/0383585 A1* 12/2021 Zhao .................... G06F 18/214
2022/0044352 A1* 2/2022 Liao .................... G06F 18/2135

FOREIGN PATENT DOCUMENTS

WO WO-2020248767 A1 * 12/2020 ........... G06N 3/0454

OTHER PUBLICATIONS

Mustafa et al., "Transformation Consistency Regularization—A Semi-supervised Paradigm for Image-to-Image Translation," 2020, (eds) Computer Vision—ECCV 2020. ECCV 2020, Lecture Notes in Computer Science( ), vol. 12363. Springer, Cham. https://doi.org/10.1007/978-3-030-58523-5_35 (Year: 2020).*

(Continued)

*Primary Examiner* — Emily C Terrell
*Assistant Examiner* — Julia Z. Yao
(74) *Attorney, Agent, or Firm* — Nicholson De Vos Webster & Elliott LLP

(57) ABSTRACT

Embodiments are disclosed for translating an image from a source visual domain to a target visual domain. In particular, in one or more embodiments, the disclosed systems and methods comprise a training process that includes receiving a training input including a pair of keyframes and an unpaired image. The pair of keyframes represent a visual translation from a first version of an image in a source visual domain to a second version of the image in a target visual domain. The one or more embodiments further include sending the pair of keyframes and the unpaired image to an image translation network to generate a first training image and a second training image. The one or more embodiments further include training the image translation network to translate images from the source visual domain to the target visual domain based on a calculated loss using the first and second training images.

20 Claims, 12 Drawing Sheets

(58) Field of Classification Search
CPC .......... G06T 2207/10016; G06T 2207/20081; G06V 10/54; G06N 3/08
See application file for complete search history.

(56) References Cited

OTHER PUBLICATIONS

Junginger et al., "Unpaired High-Resolution and Scalable Style Transfer Using Generative Adversarial Networks," 2018, in Computing Research Repository (CoRR), pp. 1-10, abs/1810.05724. (Year: 2018).*

Benard, P. et al., "Stylizing Animation by Example," ACM Transactions on Graphics, vol. 32, Issue 4, Article 119, Jul. 2013, pp. 1-12.

Fiser, J. et al., "Example-Based Synthesis of Stylized Facial Animations," ACM Transactions on Graphics (Proc. of SIGGRAPH 2017), vol. 36, No. 4, Article 155, Jul. 30, 2017, 11 pages.

Fiser, J. et al., "StyLit: Illumination-Guided Example-Based Stylization of 3D Renderings," ACM Trans. Graph. 35, 4, Article 92, Jul. 2016, 11 pages.

Futschik D. et al., " Real-Time Patch-Based Stylization of Portraits Using Generative Adversarial Network," Proceedings of the 8th ACM/Eurographics Expressive Symposium on Computational Aesthetics and Sketch Based Interfaces and Modeling and Non-Photorealistic Animation and Rendering (Expressive '19), Eurographics Association, May 2019, pp. 33-42.

Gatys, L. et al., "Image Style Transfer Using Convolutional Neural Networks," 2016 IEEE Conference on Computer Vision and Pattern Recognition (CVPR), Jun. 2016, pp. 2414-2423.

Hertmann, A. et al., "Image Analogies," Proceedings of the 28th annual conference on Computer graphics and interactive techniques (SIGGRAPH '01), Aug. 2001, pp. 327-340.

Isola P. et al., "Image-to-Image Translation with Conditional Adversarial Networks," 2017 IEEE Conference on Computer Vision and Pattern Recognition (CVPR), Jul. 2017, pp. 5967-5976.

Jamriska, O. et al., "Stylizing Video by Example," ACM Transactions on Graphics (TOG), vol. 38, No. 4, Article 107, Jul. 2019, 11 pages.

Johnson J. et al., "Perceptual Losses for Real-Time Style Transfer and Super-Resolution," Computer Vision—ECCV 2016, Lecture Notes in Computer Science, vol. 9906, Sep. 2016, pp. 694-711, retrieved via Internet: https://link.springer.com/chapter/10.1007/978-3-319-46475-6_43#Sec2.

Liao, J. et al., "Visual Attribute Transfer Through Deep Image Analogy," ACM Transactions on Graphics (TOG), 36, May 2017, 15 pages.

Texler, O. et al., "Interactive Video Stylization Using Few-Shot Patch-Based Training," ACM Trans. Graph. 39, 4, Article 73, Aug. 2020, 11 pages.

\* cited by examiner

NEURAL NETWORK FOR IMAGE STYLE TRANSLATION

BACKGROUND

Image style transfer involves the manipulation of digital image or video sequences by translating the source image or video from a source visual domain to a different visual domain. For example, a common usage is manipulating a photograph to adopt an artistic style of a painting. However, many image style transfer techniques can be difficult to use or are simply not powerful enough to achieve a desired effect, particularly for translating image frames from video sequences.

One existing solution is the Image Analogies framework which requires a user to provide a set of guidance channels that encourage the synthesis algorithm to transfer smaller patches of the style exemplar onto desired spatial locations in the target image. Those channels, however, need to be prepared explicitly by the user or generated algorithmically for a limited target domain. Further, creating the guidance channels is cumbersome, and it may not be always clear how to design algorithms for obtaining them automatically.

Another existing solution is optical flow tracking, in which a system is provided a pair of keyframes that includes a source frame and a target frame. The system then tracks each pixel from the target frame through each frame of a provided video sequence to identify how each pixel is moving from frame to frame. The system then transfers the stylization to the tracked pixel in each frame. However, the output of optical flow tracking solutions begin to break down as the length of a video sequence increases, resulting in degraded quality, requiring a user to provide an updated keyframe.

Existing neural network solutions for style transference rely on the assumption that one can encode semantic similarity using the correspondence of statistics of neural features extracted from responses of a VGG network. Although such an assumption holds in some cases, it is not easy to amend when it fails. Moreover, in contrast to patch-based methods, neural techniques tend to produce noticeable visual artifacts due to their statistical nature. This drawback can be partially alleviated by applying patch-based synthesis in the neural domain. However, since neural features are transferred explicitly, the requirement of knowledge of accurate correspondences is still unavoidable.

These and other problems exist with regard to systems that perform image style transfers.

SUMMARY

Introduced here are techniques/technologies that use machine learning to translate an image from a source visual domain to a target visual domain. For example, in some embodiments, an image translation network receives a training input including a pair of keyframes of a training video sequence and an unpaired image. The pair of keyframes includes a first version of an image in a source visual domain to a second version of the image in a target visual domain, where the target visual domain is a stylized version of the image. The image translation network uses the pair of keyframes and the unpaired image to learn to translate images from the source visual domain to the target visual domain. The image translation network concurrently generating a first training image representing a neural network translation of the first version of the image in the source visual domain to the target visual domain and a second training image representing the unpaired image translated to the target visual domain.

Additionally, the image translation network is trained using multiple loss functions, where a first loss function compares the first training image to the second version of the image in a target visual domain, and the second loss function compares the second training image to the second version of the image in a target visual domain. The loss functions enable the image translation network to learn how to translate images from the source visual domain to the target visual domain even when images deviate from the first version of the image in the pair of keyframes.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a visual translation system that uses machine learning to perform translations of images from a source visual domain to a target visual domain. The visual translation system deploys an image translation network that has been trained to perform the translation. The image translation network is trained using a pair of keyframes (e.g., a first version of an image in a source visual domain and a second version of the image stylized into a target visual domain) and an unpaired image. Using the pair of keyframes and the unpaired image, the image translation network learns to replicate a stylization of the target visual domain to generate a translated version of the unpaired image in the target visual domain to translate similar or additional images from a source visual domain to a target visual domain indicated by the pair of keyframes. Once trained, the image translation network can receive additional images in a similar or same source visual domain as the image in the pair of keyframes (e.g., taken under the same or similar illumination conditions as the image, from a same video sequence or render as the image, image taken at a same or similar location as the source image, etc.) and translate the additional images to the target visual domain.

Embodiments address the deficiencies of prior techniques that begin to degrade in quality as the length of an input video sequence increases. For example, the image translation network is a neural network architecture that considers other frames from the input (e.g., video sequence, image, etc.) during the training phase. This enables the image translation network to ensure temporal stability without explicit guidance and better preserve style when the remaining video/image frames deviate from the original keyframe. The visual translation system described herein further can be used in other situations in addition to translating a video input, including translation of a stylization of a portion to a larger image (e.g., a panoramic image), translation of 3D renders, and translation of different portraits captured under similar illumination conditions to the keyframe.

Figure 1:
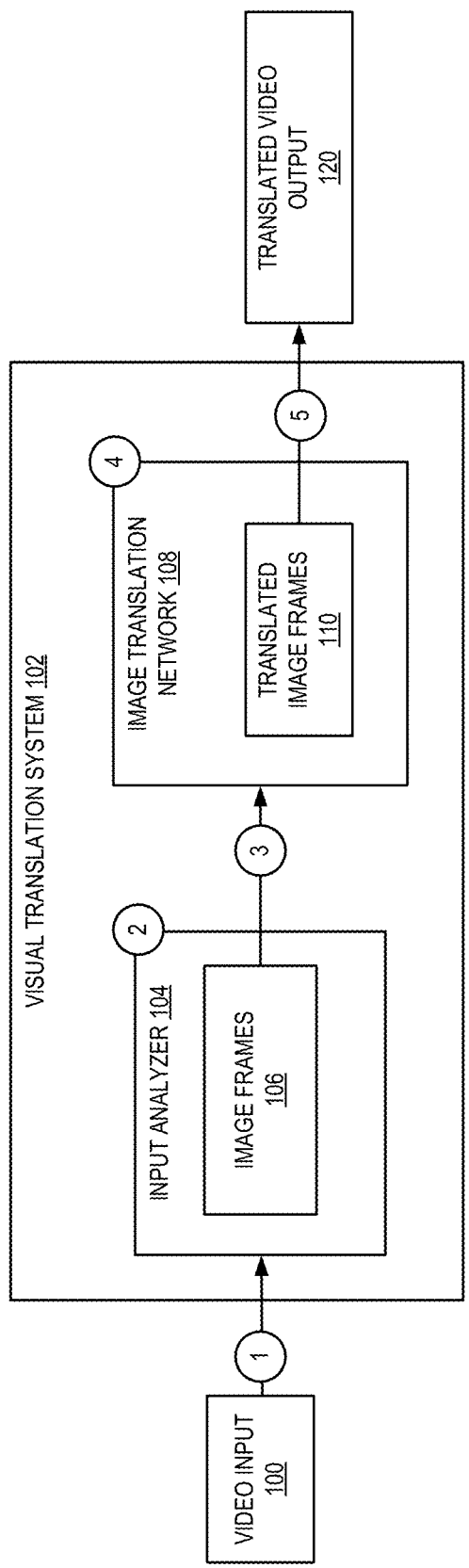
FIG. 1 illustrates a diagram of a process of translating frames of an input from a source visual domain to a target visual domain using a trained machine learning model in accordance with one or more embodiments.

FIG. 1 illustrates a diagram of a process of translating frames of an input from a source visual domain to a target visual domain using a trained machine learning model in accordance with one or more embodiments. As shown in FIG. 1, in one or more embodiments, a visual translation system 102 receives a video input 100, as shown at numeral 1. For example, the visual translation system 102 receives the video input 100 from a user via a computing device. In one or more embodiments, the video input 100 can include a video file that includes a plurality of image frames. In one example, a user may select a video file in an application. In other examples, a user may submit a video file to a web service, or an application configured to receive video files as inputs and provide a translated video file as outputs. In other embodiments, the video input 100 is a real-time video stream in which image frames are continuously provided as input to the visual translation system 102.

In one or more embodiments, the visual translation system 102 includes an input analyzer 104 that receives the video input 100. In one or more embodiments, the input analyzer 104 analyzes the video input 100 to extract image frames 106, as shown at numeral 2. The input analyzer 104 can extract the image frames 106 from the video input 100 at a predetermined sample rate. In one or more embodiments, where the video input 100 is a real-time video stream, the input analyzer 104 generates the image frames 106 as additional portions of the real-time video stream are received by the visual translation system 102. After extracting the image frames 106, the input analyzer 104 can send the image frames 106 to an image translation network 108, as shown at numeral 3.

In one or more embodiments, the image translation network 108 is a neural network that includes deep learning architecture for learning representations of audio. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the image translation network generates translated image frames 110 from the image frames 106, as shown at numeral 4. After a training phase, described herein with respect to FIG. 2, the image translation network 108 has been trained to translate the image frames 106 from a source visual domain of the image frames 106 to a target visual domain. Translating the image frames 106 from the source visual domain to the target visual domain includes transferring a learned style modification. In the training phase, the image translation network 108 learns how to translate from the source visual domain to the target visual domain by being trained using a pair of keyframes provided by a user, where the pair of keyframes include a source image in the source visual domain and a stylized version of the source image in the target visual domain (or ground truth image). In one or more embodiments, the stylized version of the source image in the target visual domain is created manually by a user (e.g., using an application).

In one or more embodiments, after the image translation network 108 has translated the image frame to the translated image frames 110, the image translation can output a translated video output 120 based on the translated image frames 110, as shown at numeral 5. Where the video input 100 is a real-time video stream, the image translation network 108 outputs the translated video output 120 as a series of sequential image frames that can be displayed by a computing device.

Figure 2:
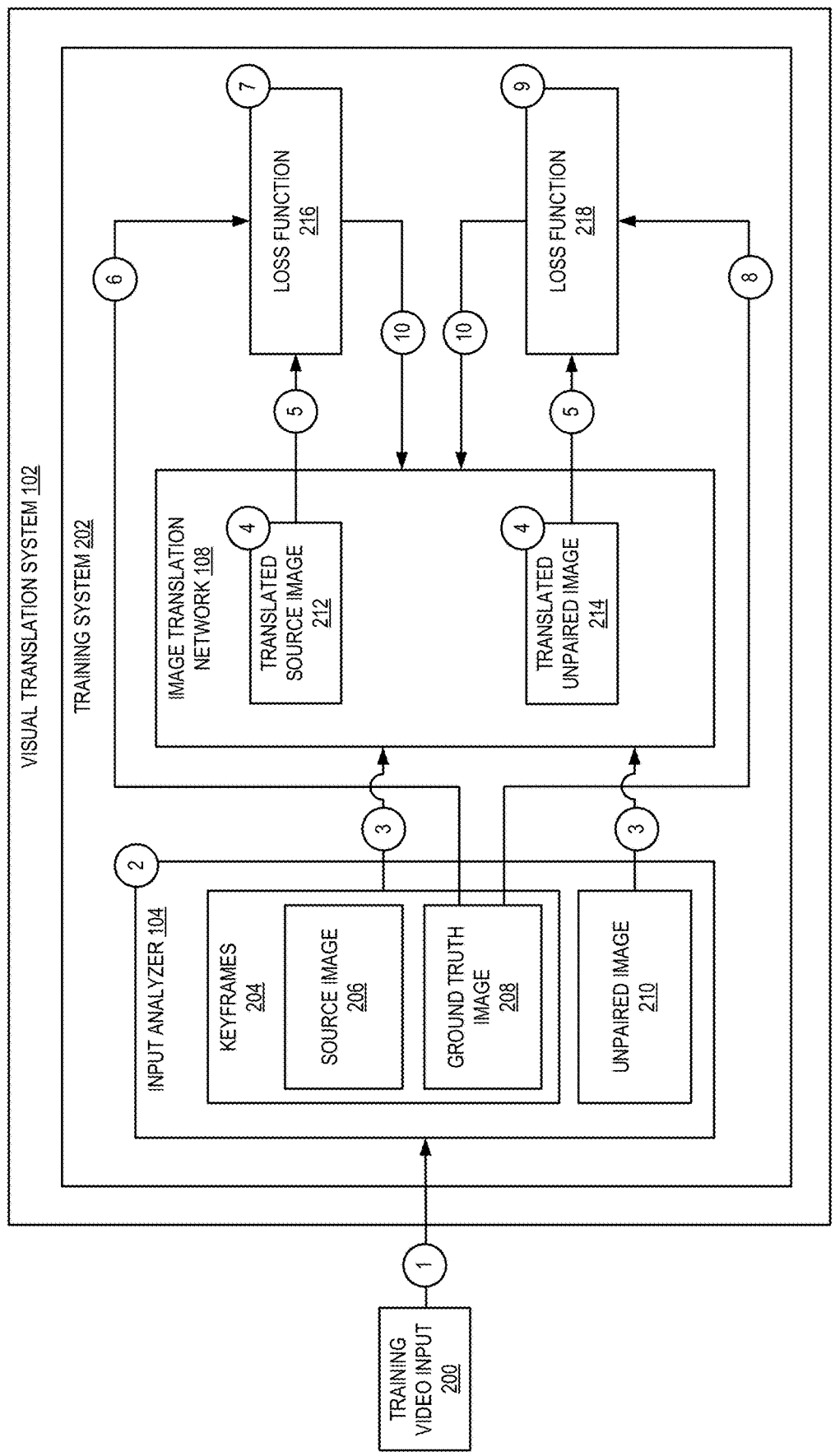
FIG. 2 illustrates a diagram of a training system for training a machine learning model to translate images from a source visual domain to a target visual domain using loss functions in accordance with one or more embodiments.

FIG. 2 illustrates a diagram of a training system for training a machine learning model to translate images from a source visual domain to a target visual domain using loss functions in accordance with one or more embodiments. Embodiments use two loss functions during training which train the image translation network to learn to translate images from a source visual domain to a desired or specified target visual domain.

As shown in FIG. 2, training proceeds similarly to the inference process described above with respect to FIG. 1. The training system 202 receives a training video input 200, as shown at numeral 1. For example, the visual translation system 102 receives the training video input 200 from a user via a computing device or from a memory or storage location. Although depicted as part of visual translation system 102, in various embodiments, training system 202 may be implemented as a separate system implemented on electronic devices separate from the electronic devices implementing visual translation system 102. In one or more embodiments, the training video input 200 includes at least a pair of keyframes 204 and an unpaired image 210. The pair of keyframes 204 can include a source image 206 and a ground truth image 208, where the source image 206 is in a source visual domain and the ground truth image 208 is in a target visual domain. The target visual domain is a stylized version of the source image 206 (e.g., modified by a user from the source visual domain). The unpaired image 210 can be an image frame from a same video sequence as the source image 206 or an image frame in a similar visual domain to the source image 206 (e.g., images with similar illumination conditions, an image frame from a same video sequence as the source image 206, an image taken at a same location as the source image 206, etc.).

Although FIG. 2 depicts a single pair of keyframes 204 and a single unpaired image 210, the training video input 200 can include multiple keyframes and multiple unpaired images that can be fed to the visual translation system 102 in parallel or in series. In one or more embodiments, the unpaired image 210 can include a plurality of images (e.g., from a video sequence), where the plurality of images includes image frames that depict most or all of the changes in the video sequence. For example, where the subject of the video sequence is a person, the plurality of images selected as unpaired images for training the image translation network 108 can include frames showing different poses (e.g., facing forward, facing to the left or right, exhibiting different expressions, etc.). In one or more embodiments, feeding the image translation network 108 a plurality of unpaired images of the subject in different poses can produce a better trained model. For example, feeding the image translation network 108 an equal distribution of poses can train the image translation network 108 how to stylize/translate a greater variety of image frames. In contrast, training using only a single unpaired image in a single pose or a plurality of unpaired image with a large number of frames in a single pose can result in frequency bias where the model learns to translate some particular poses well (e.g., poses it more frequently was trained on), while failing when provided with any deviations from those particular poses.

In one or more embodiments, the training system 202 includes an input analyzer 104 that receives the training video input 200. In one or more embodiments, the input analyzer 104 analyzes the training video input 200 to identify the pair of keyframes 204 (the source image 206 and the ground truth image 208) and the unpaired image 210, as shown at numeral 2. After identifying the pair of keyframes 204 and the unpaired image 210, the input analyzer 104 can send the pair of keyframes 204 and the unpaired image 210 to an image translation network 108, as shown at numeral 3.

In one or more embodiments, the image translation network 108 concurrently translates the source image 206 to translated source image 212 and the unpaired image 210 to translated unpaired image 214, as shown at numeral 4. In one or more embodiments, the pair of keyframes 204 and the unpaired image 210 are used during an optimization process of the image translation network 108. The image translation network 108 can be represented by a neural translation model F. Using neural translation model F, the image translation network 108 can stylize the unpaired image 210 in a semantically meaningful way to produce one or more output images in which important visual features of artistic styles of the ground truth image 208 are reproduced at appropriate locations. In one or more embodiments, the neural translation model F, is a U-Net-like network suitable for style transfer tasks that can reproduce important high-frequency details for generating believable artistic styles.

In one or more embodiments, the training system 202 uses two loss functions (e.g., loss function 216 and loss function 218) to minimize the loss of the neural translation model F during trained. The image translation network 108 sends the translated source image 212 to the loss function 216 and sends the translated unpaired image 214 to the loss function 218, as shown at numeral 5.

In one or more embodiments, the loss function 216 receives or retrieves the ground truth image 208 of keyframes 204, as shown at numeral 6. For example, the loss function 216 can receive or retrieve the ground truth image 208 from a memory or storage location. Loss function 216 may then determine an $L_1$ loss of the image translation network 108, as shown at numeral 7. The L1 loss function can minimize the error of the image translation network 108 based on the sum of all the absolute differences between the true value (the ground truth image 208) and the predicted value (the translated source image 212).

In one or more embodiments, the loss function 218 similarly receives or retrieves the ground truth image 208 of keyframes 204, as shown at numeral 8. For example, the loss function 216 can receive or retrieve the ground truth image 208 from a memory or storage location. Loss function 218 may then determine a gram matrix matching loss (or VGG Gram loss) of the image translation network 108, as shown at numeral 9. To determine the gram matrix matching loss, a style matrix is computed for each of the translated unpaired image 214 and the ground truth image 208. The gram matrix matching loss can then be defined as the root mean square difference between the two style matrices. The matrices capture the distribution of features of a set of feature maps in a given layer. By minimizing the style loss between the two images, the loss function 218 is matching the distribution of features between the two images.

The gram matrix matching loss function can act as a regularizer for the stylization of images output by the image translation network 108 to prevent the model From overfitting to the keyframes 204. In addition, the gram matrix matching loss function can provide a measure of a visual consistency between the translated unpaired image 214 and the ground truth image 208.

In one or more embodiments, the training system 202 combines the two loss functions to obtain an objective function to minimize, as shown below.

$$\sum_i |\mathcal{F}(X_i; \theta) - Y_i| + \lambda \sum_{j,k} \sum_l \|\mathcal{G}^l(\mathcal{F}(Z_j; \theta)) - \mathcal{G}^l(Y_k)\|^2$$

where $K_i=(X_i, Y_i)$ are keyframes (e.g., $X_i$ is an image and $Y_i$ its user-stylized counterpart), $Z_i$ is the one or more unpaired images, $\theta$ is a set of weights of F to be optimized, $G^l$ is a Gram correlation matrix calculated at layer $l \in L$ after extracting VGG network responses of the given image, and $\lambda$ is a weighting coefficient.

The results of the combination of loss functions 216 and 218 are backpropagated to the image translation network, as shown at numeral 10. By minimizing the objective function, the training system 202 produces a trained model, which in turn can stylize unpaired images from via a feed-forward pass. In one or more embodiments, the combination of the L1 loss function and the gram matrix matching loss function trains the image translation network 108 to preserve the high-frequency details of the image when stylized, while maintaining the style consistency on the translated unpaired image 210, respectively. In one or more embodiments, after being trained using the keyframes 204 and the unpaired image 210, the image translation network 108 can translate images having the same or similar source visual domain as the source image 206 to the same target visual domain of the stylized ground truth image 208.

Figure 3:
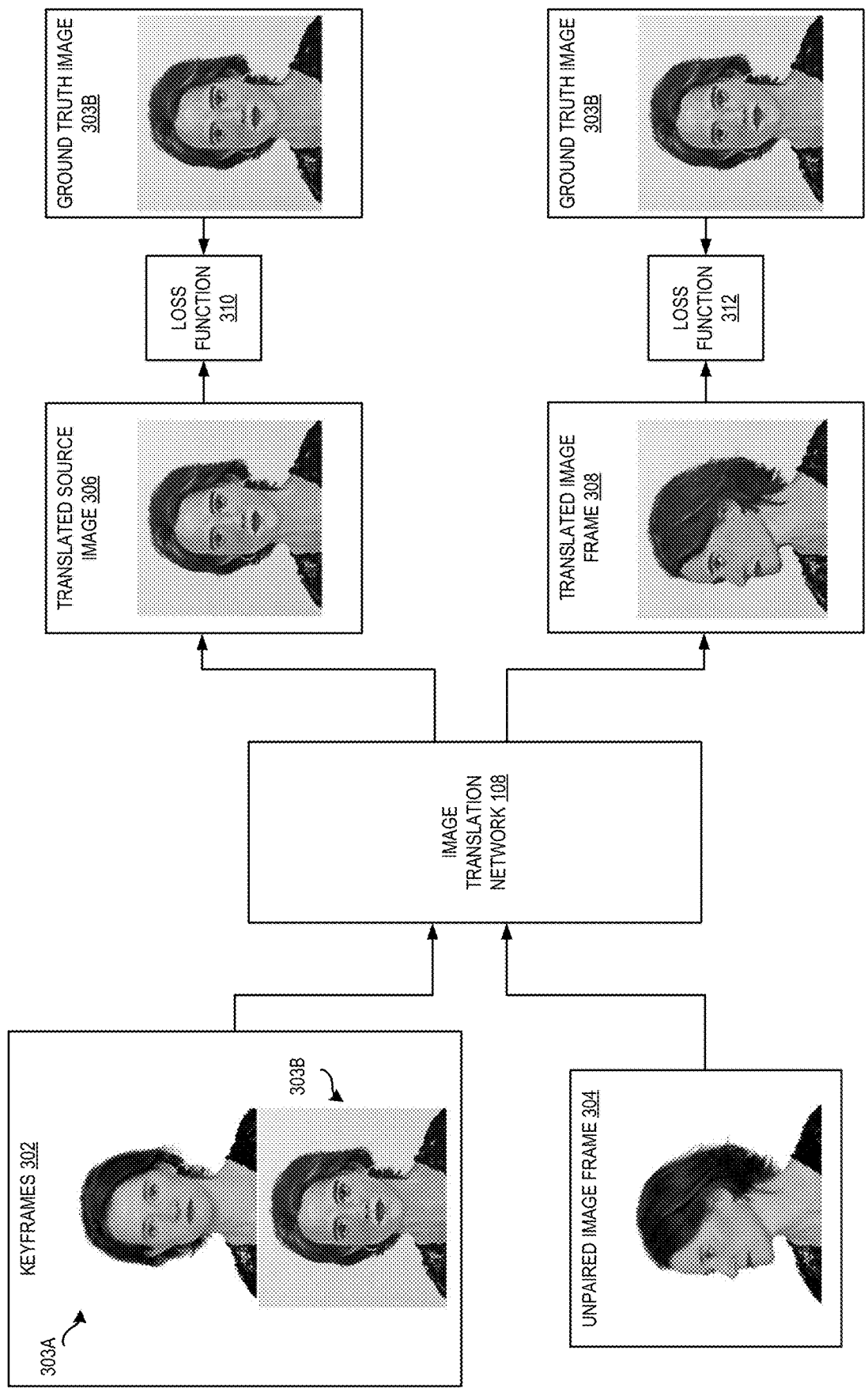
FIG. 3 illustrates an example of training an image translation network to perform visual translations of an image using a pair of keyframes in accordance with one or more embodiments.

FIG. 3 illustrates an example of training an image translation network to perform visual translations of image frames using a pair of keyframes in accordance with one or more embodiments. As shown in FIG. 3, the image translation network 108 is being trained to translate images from a source visual domain of a first version of an image (e.g., a source image 303A) in the pair of keyframes 302 to a target visual domain of a second version of the image (e.g., a ground truth image 303B) in the pair of keyframes 302. In one or more embodiments, the ground truth image 303B has been stylized (e.g., by a user) from the original source image 303B. As shown in FIG. 3, the image translation network 108 is fed the pair of keyframes 302 and an unpaired image frame 304. In other embodiments, the image translation network 108 can be fed more than one unpaired image frames.

In FIG. 3 the unpaired image frame 304 depict the same subject in similar conditions as the source image 303A in the pair of keyframes 302. For example, the unpaired image frame 304 can be an image taken at the same location or under similar lighting conditions as the source image 303A, or the unpaired image frame 304 can be a video frame extracted from a same or similar video sequence as the source image 303A. The pair of keyframes 302 and the unpaired image frame 304 are then used to train the image translation network 108 to transfer or replicate the target visual domain (e.g., the stylization of the ground truth image 303B) to subsequently received inputs. As part of the training, the image translation network 108 generates translated image frame 308 from the unpaired images frames 304 and generates a translated source image 306.

As illustrated in FIG. 3, the image translation network 108 has replicated the stylization of the ground truth image 303B to the translated image frame 308. To minimize the loss, the outputs of the image translation network 108 are provided to two loss functions. A first loss function (e.g., loss function 310) compares the translated source image 306 to the ground truth image 303B to determine how closely the image translation network 108 replicated the ground truth image 303B. A second loss function (e.g., loss function 312) compares the translated image frame 308 to the ground truth image 303B to determine how closely the image translation network 108 replicated the style of the ground truth image 303B.

As noted above, the unpaired image frame 304 can be a video frame extracted from a same or similar video sequence as the source image 303A. In one or more embodiments, the video sequence can be a portion of a video call and can be used to facilitate the training of the image translation network 108 for real-time translation of video calls or other types of streaming video. In one or more embodiments, for real-time stylization of a video call, a user records a short video sequence capturing their face. In such embodiments, a most representative frame is selected from the video sequence and used as the first version of the image in the source visual domain. The user then provides a stylized counterpart as the second version of the image in the target visual domain. In one or more embodiments, the user provides, or the visual translation system selects, one or more other image frames from the video sequence as the unpaired images provided to the image translation network. For example, the one or more other image frames can be selected to provide a variety of different poses of the subject of the video sequence. A neural translation model F is optimized, as described above, using these inputs, and can then be used to stylize captured or received image frames from subsequent video calls in real-time.

Figure 4:
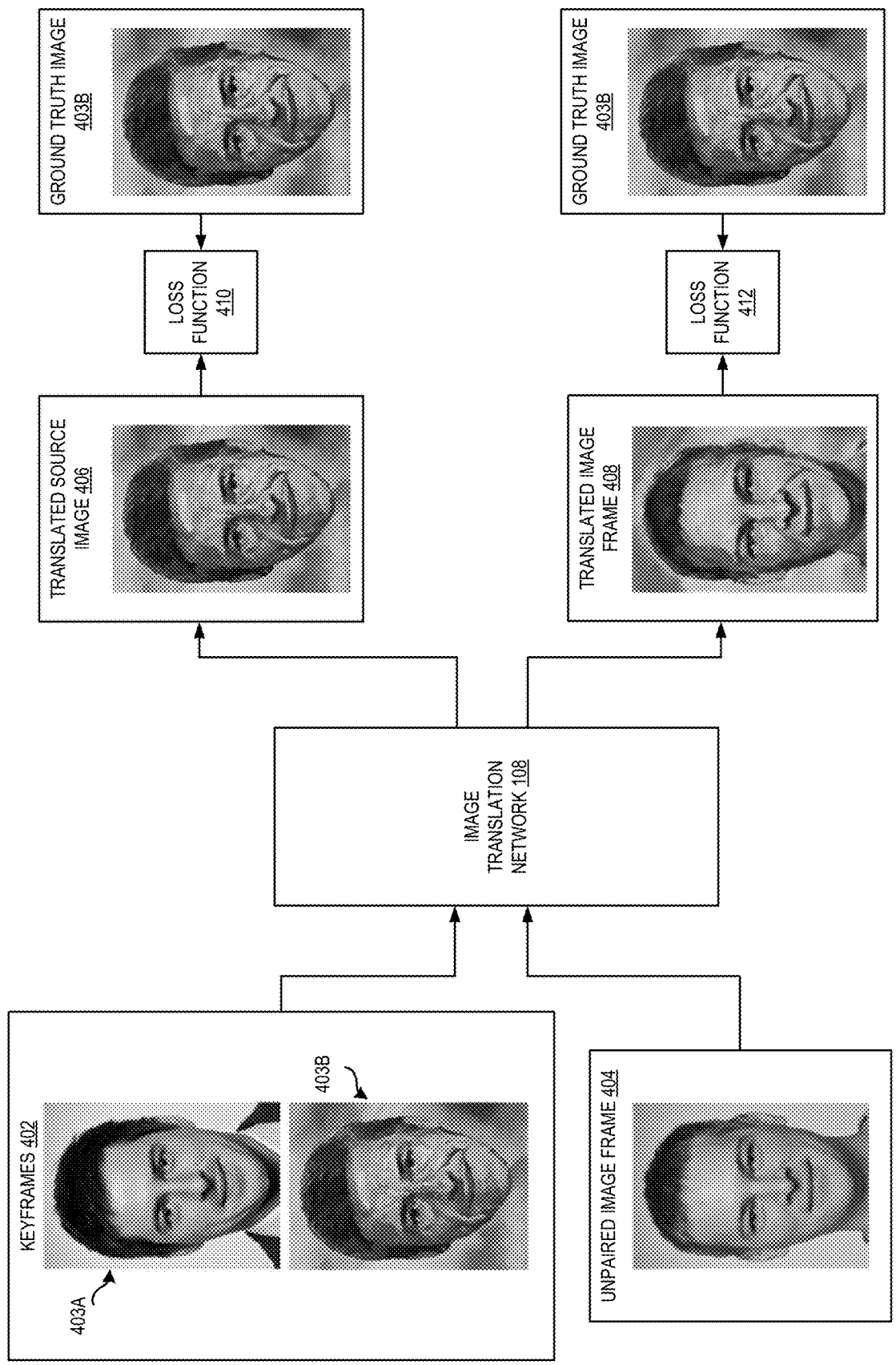
FIG. 4 illustrates an example of training an image translation network to perform visual translations of an image using a pair of keyframes in accordance with one or more embodiments.

FIG. 4 illustrates an example of training an image translation network to perform visual translations of an image using a pair of keyframes in accordance with one or more embodiments. As shown in FIG. 4, the image translation network 108 is being trained to translate images from a source visual domain of a first version of an image (e.g., a source image 403A) in the pair of keyframes 402 to a target visual domain of a second version of the image (e.g., a ground truth image 403B) in the pair of keyframes 402. In one or more embodiments, the ground truth image 403B has been stylized (e.g., by a user) from the original source image 403A. As shown in FIG. 4, the image translation network 108 is fed the pair of keyframes 402 and an unpaired image frame 404. In other embodiments, the image translation network 108 can be fed more than one unpaired image frames.

In this example of FIG. 4, the unpaired image frame 404 depicts a different subject from the subject depicted in the pair of keyframes 402. However, the unpaired image frame 404 has similar conditions in the pair of keyframes 402. For example, the unpaired image frame 404 can be an image taken at the same location or under similar lighting conditions as the source image 403A. The pair of keyframes 402 and the unpaired image frame 404 are then used to train the image translation network 108 to transfer or replicate the target visual domain (e.g., the stylization of the ground truth image 403B) to subsequently received inputs. As part of the training, the image translation network 108 generates translated image frame 408 from the unpaired images frames 404 and generates a translated source image 406.

As illustrated in FIG. 4, the image translation network 108 has replicated the stylization of the ground truth image 403B to the translated image frame 408. To minimize the loss, the outputs of the image translation network 108 are provided to two loss functions. A first loss function (e.g., loss function 410) compares the translated source image 406 to the ground truth image 403B to determine how closely the image translation network 108 replicated the ground truth image 403B. A second loss function (e.g., loss function 412) compares the translated image frame 408 to the ground truth image 403B to determine how closely the image translation network 108 replicated the style of the ground truth image 403B.

Figure 5:
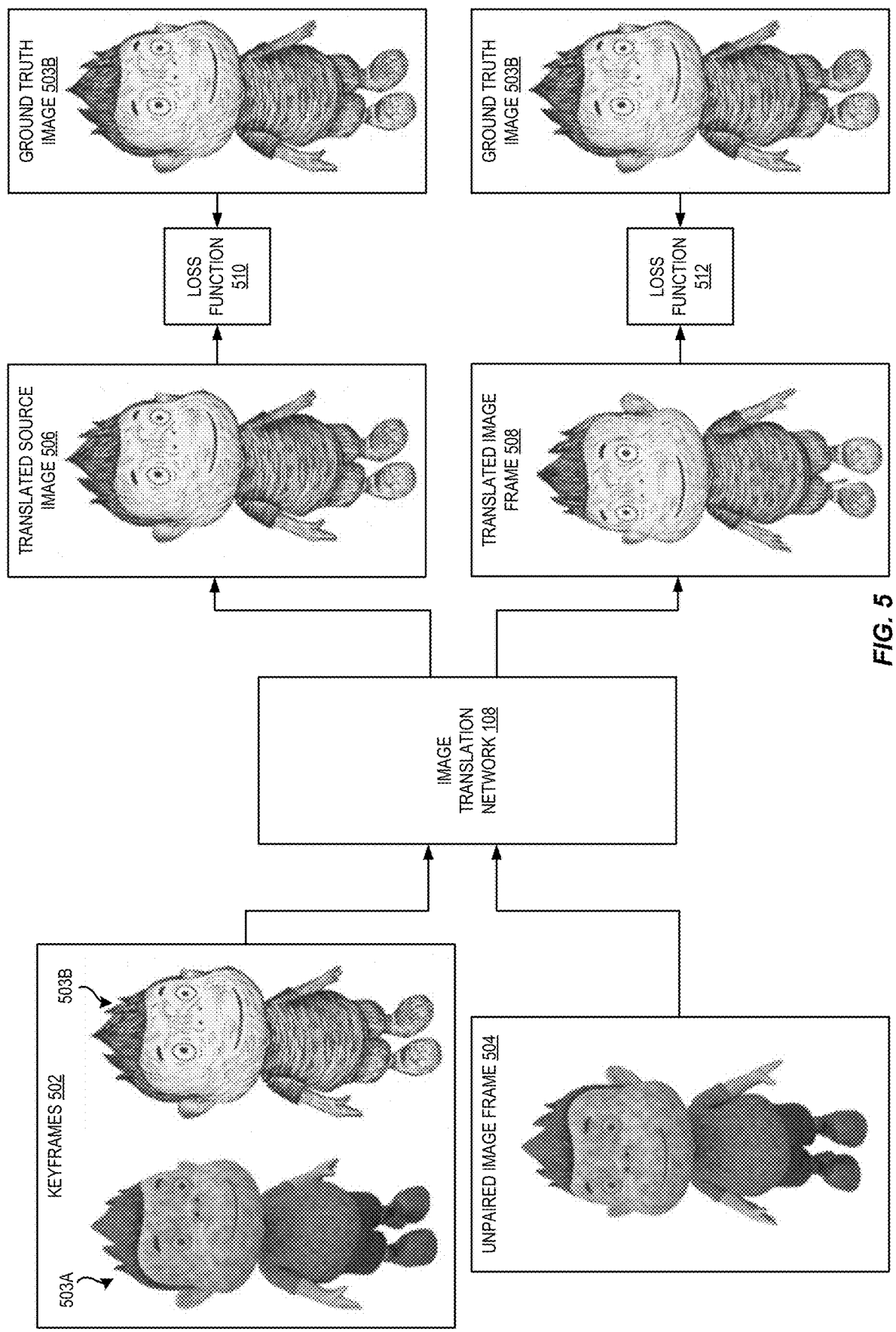
FIG. 5 illustrates an example of training an image translation network to perform visual translations of a three-dimensionally rendered model using a pair of keyframes in accordance with one or more embodiments.

FIG. 5 illustrates an example of training an image translation network to perform visual translations of a three-dimensionally rendered model using a pair of keyframes in accordance with one or more embodiments. As shown in FIG. 5, the image translation network 108 is being trained to translate images from a source visual domain of a first version of a rendered model (e.g., a source image 503A) in the pair of keyframes 502 to a target visual domain of a second version of the rendered model (e.g., a ground truth image 503B) in the pair of keyframes 502. In one or more embodiments, the second version of the rendered model has been stylized (e.g., by a user) to appear as a hand drawn animated figure. In one or more embodiments, style transfers to 3D models can function like video or image stylization, with some additional features. For example, a user can select a camera viewpoint from which the 3D model is rendered to get the source image 503A in the pair of keyframes 502. Further, in some embodiments, the image translation network 108 can be sensitive to local variations. One way to avoid this issue is to select the source image 503A to avoid an angle or viewpoint that includes larger flat regions which can make the translation ambiguous. Another method to address this issue is to add a noisy texture to the 3D model to alleviate the ambiguity (as in the source image 503A in the keyframes 502).

As shown in FIG. 5, the image translation network 108 is fed the pair of keyframes 502 and an unpaired image frame 504. In other embodiments, the image translation network 108 can be fed more than a single unpaired image frame 504. In FIG. 5 the unpaired image frame 504 depicts the same rendered model in similar conditions as the source image 503A in the pair of keyframes 502. For example, the unpaired image frame 504 can be from a same rendered sequence or from a rendered sequence with similar lighting conditions as the source image 503A in the pair of keyframes 502. The pair of keyframes 502 and the unpaired image frame 504 are then used to train the image translation network 108 to transfer or replicate the target visual domain (e.g., the stylization of the second version of the rendered model in the pair of keyframes 502) to subsequently received inputs. As part of the training, the image translation network 108 generates translated image frame 508 from the unpaired image frame 504 and generates a translated source image 506. As illustrated in FIG. 5, the image translation network 108 has replicated the stylization of the ground truth image 503B in the pair of keyframes 502 in translated image frame 508. To minimize the loss, the outputs of the image translation network 108 are provided to two loss functions. A first loss function (e.g., loss function 510) compares the translated source image 506 to the ground truth image 503B to determine how closely the image translation network 108 replicated the ground truth image 503B. A second loss function (e.g., loss function 512) compares the translated image frame 508 to the ground truth image 503B to determine how closely the image translation network 108 replicated the style of the ground truth image 503B.

In one or more embodiments, weights θ of the neural translation model F are optimized and the image translation network 108 can then be used in an interactive scenario where the user changes the camera viewpoint, the 3D model is rendered on the fly, and immediately stylized using the trained neural translation model F.

Figure 6:
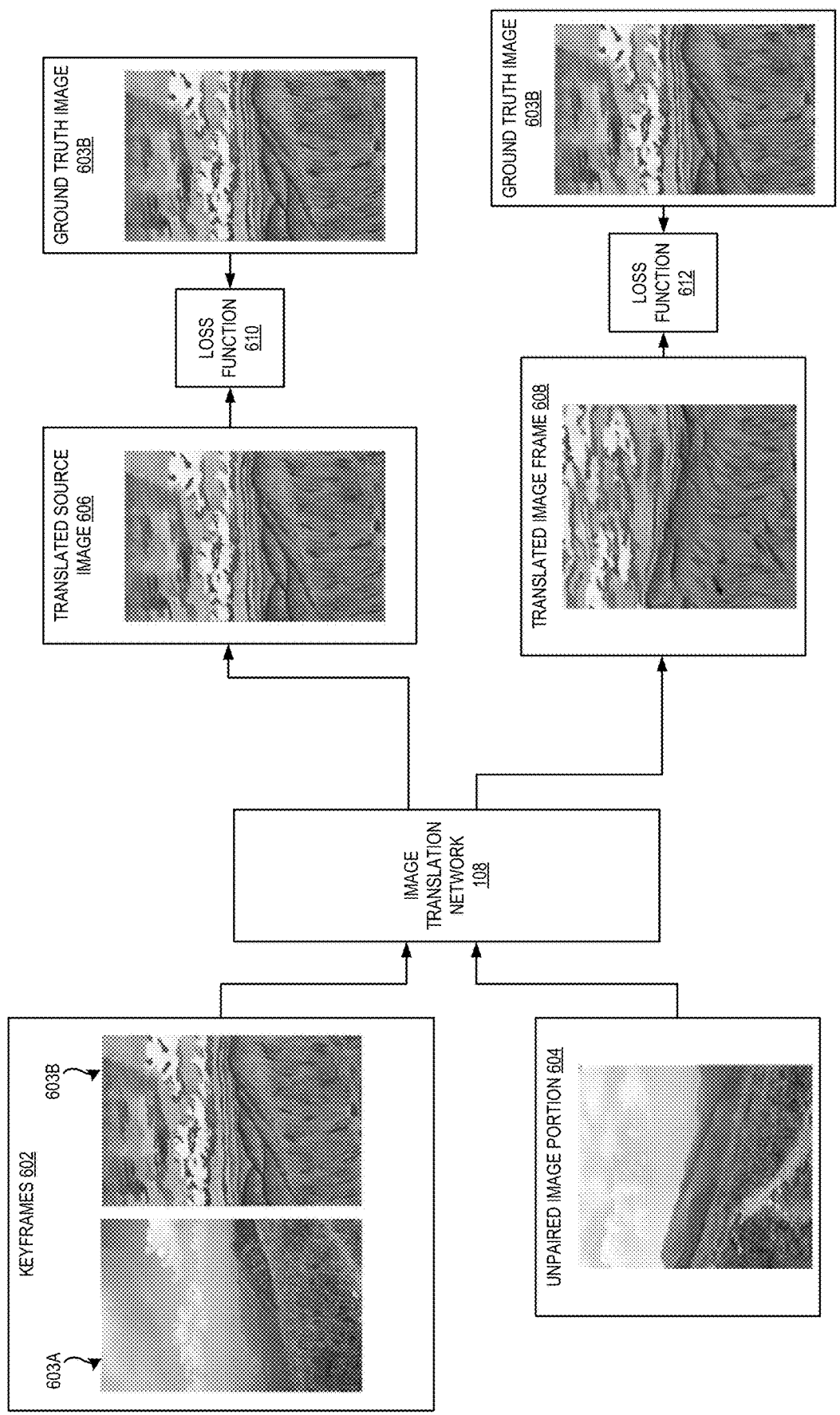
FIG. 6 illustrates an example of training an image translation network to perform visual translations of an image using a pair of keyframes for a portion of the image in accordance with one or more embodiments.

FIG. 6 illustrates an example of training an image translation network to perform visual translations of an image using a pair of keyframes for a portion of the image in accordance with one or more embodiments. As shown in FIG. 6, the image translation network 108 is being trained to translate images from a source visual domain of a first version of an image (e.g., a source image 603A) in the pair of keyframes 602 to a target visual domain of a second version of the image (e.g., a ground truth image 603B) in the pair of keyframes 602. In one or more embodiments, the ground truth image 603B has been stylized (e.g., by a user) to appear as a painted version.

As shown in FIG. 6, the image translation network 108 is fed the pair of keyframes 602 and an unpaired image portion 604. In the example of FIG. 6, the source image 603A and the stylized ground truth image 603B in the pair of keyframes 602 are a segment of a larger panoramic image, of which the unpaired image portion 604 is a segment. The pair of keyframes 602 and the unpaired image portion 604 are then used to train the image translation network 108 to transfer or replicate the target visual domain (e.g., the stylization of the ground truth image 603B) to subsequently received inputs (e.g., image segments of the larger panoramic image). As part of the training, the image translation network 108 generates translated image frame 608 from the unpaired image portion 604 and generates a translated source image 606. As illustrated in FIG. 6, the image translation network 108 has replicated the stylization of the second version of the rendered model in the pair of keyframes 602 in translated image frame 608. To minimize the loss, the outputs of the image translation network 108 are provided to two loss functions. A first loss function (e.g., loss function 610) compares the translated source image 606 to the ground truth image 603B to determine how closely the image translation network 108 replicated the ground truth image 603B. A second loss function (e.g., loss function 612) compares the translated image frame 608 to the ground truth image 603B to determine how closely the image translation network 108 replicated the style of the ground truth image 603B.

Figure 7:
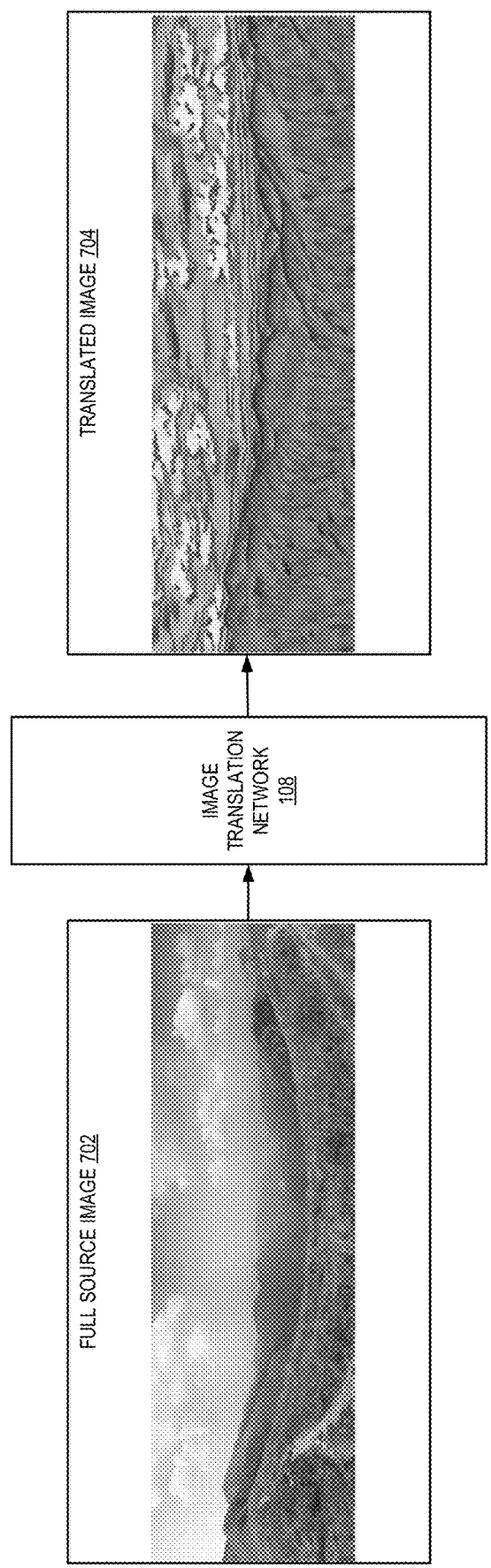
FIG. 7 illustrates an example of an inference stage of an image translation network trained to perform visual translations of an image using a pair of keyframes for a portion of the image in accordance with one or more embodiments.

FIG. 7 illustrates an example of an inference stage of an image translation network trained to perform visual translations of an image using a pair of keyframes for a portion of the image in accordance with one or more embodiments. In one or more embodiments, after the training of the image translation network 108 (described in FIG. 6), the image translation network 108 can stylize all photos (or segments) of the full source image 702 and stitch them together to output translated image 704 applying the learned stylization (e.g., from the keyframes 602 in FIG. 6). In one or more embodiments, the image translation network 108 can produce a cylindrical unwrap or provide an interactive scenario where the user changes the relative camera rotation from which a pinhole projection can be computed and stylized in real-time using the trained image translation network 108.

Figure 8:
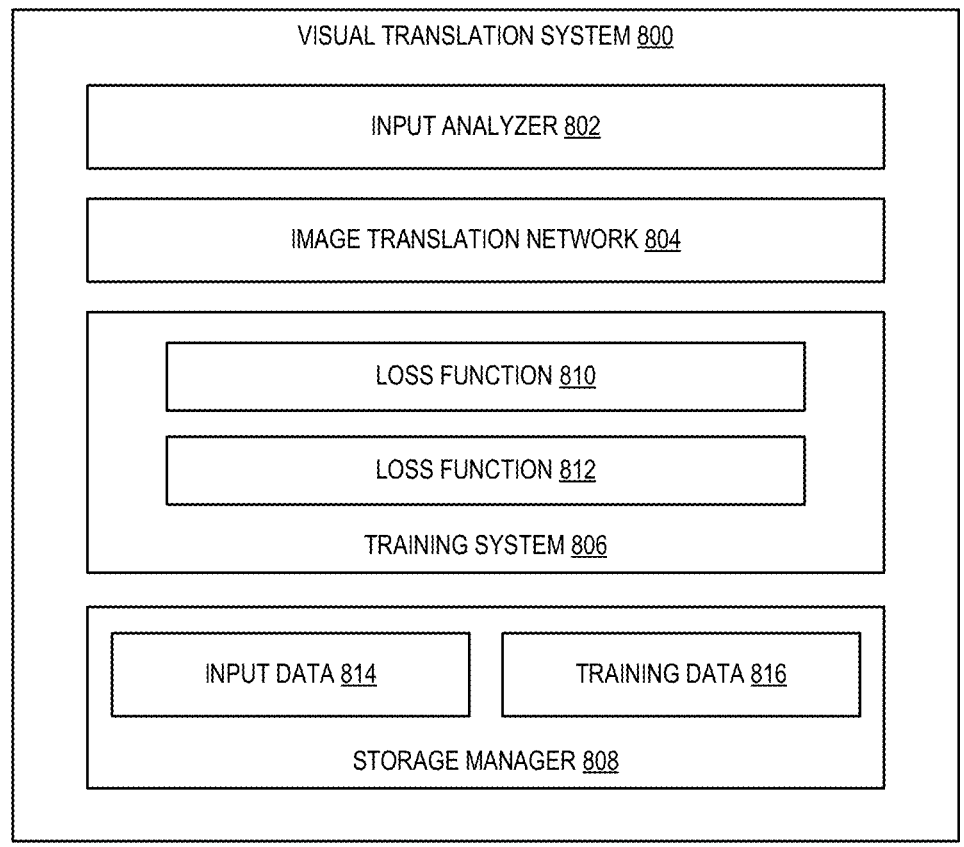
FIG. 8 illustrates a schematic diagram of visual translation system in accordance with one or more embodiments.

FIG. 8 illustrates a schematic diagram of a visual translation system (e.g., "visual translation system" described above) in accordance with one or more embodiments. As shown, the visual translation system 800 may include, but is not limited to, an input analyzer 802, an image translation network 804, a training system 806 (e.g., training system 202 described above), and a storage manager 808. The training system 806 includes loss functions 810 and 812. The storage manager 808 includes input data 814 and training data 816.

As illustrated in FIG. 8, the visual translation system 800 includes an input analyzer 802. The input analyzer 802 can be configured to receive an input (e.g., a video input during a reasoning phase) and analyze the input to generate image frames. In one or more embodiments, the input can be an image, a portion of an image, a video sequence, or a 3D model/render. The video sequence can be a completed video or a real-time video stream. During a training phase of the visual translation system 800, the input analyzer 802 can be configured to receive a training input. In one or more embodiments, the training input includes at least one pair of keyframes, including a source image in a source visual domain and a ground truth image in a target visual domain, where the ground truth image in the target visual domain is a stylized version of the source image. In one or more embodiments, the training input can also include at least one unpaired image. In some embodiments, the unpaired image can be in the same or a similar visual domain as the source image. For example, the unpaired image can have similar illumination conditions as the source image, can be from a same video sequence or render as the source image, can be an image taken at a same or similar location as the source image, etc.

As illustrated in FIG. 8, the visual translation system 800 includes an image translation network 804. In one or more embodiments, the image translation network 804 can be any deep learning architecture for learning representations of images. The image translation network 804 can receive or retrieve an input from a computing device or from a storage location (e.g., storage manager 808). The image translation network 804 can process image frames generated or extracted from the input to apply a learned stylization to translate the image frames from a source visual domain to a target visual domain. In one or more embodiments, the image translation network 804 includes a plurality of layers, including an input layer that receives inputs and performs initial processing. In one or more embodiments, the image translation network 804 uses a U-Net-like network, which is can be suitable for style transfer tasks as it allows for the reproduction of important high-frequency details that can be required for generating believable artistic styles.

During the training phase, the image translation network 804 is configured to receive a pair of keyframes, including a source image in a source visual domain and a ground truth image in a target visual domain, and the at least one unpaired image. The image translation network 804 is further configured to generate a translated source image to replicate the stylized ground truth image and generate a translated unpaired image to replicate the stylization of the ground truth image to the unpaired image. In one or more embodiments, the image translation network 804 is configured to generate the translated source image and the translated unpaired concurrently.

As further illustrated in FIG. 8, the visual translation system 800 includes training system 806 which is configured to teach, guide, tune, and/or train one or more neural networks. In particular, the training system 806 trains a neural network, such as the image translation network 804, based on a plurality of training data (e.g., training data 820). For instance, the training system 806 trains the image translation network 804 to learn to automatically translate image frames from a source visual domain to a target visual domain based on the keyframes provided in the training data. The training system 806 further trains the image translation network 804 using a pair of loss functions 810 and 812.

In one or more embodiments, the loss function 810 receives or retrieves a ground truth image from the provided keyframes and then determines an $L_1$ loss of the image translation network 804. The $L_1$ loss function can minimize the error of the image translation network 804 based on the sum of all the absolute differences between the ground truth image from the provided keyframes and the predicted value (e.g., the translated source image. In one or more embodiments, the loss function 812 similarly receives or retrieves the ground truth image from the provided keyframes and then determines a gram matrix matching loss (or VGG Gram loss) of the image translation network 804. The gram matrix matching loss function can act as a regularizer for the stylization of images output by the image translation network 804 using the translated unpaired image and the ground truth image. The results of the combination of loss functions 810 and 812 are backpropagated to the image translation network to minimize the loss.

As illustrated in FIG. 8, the visual translation system 800 also includes the storage manager 808. The storage manager 808 maintains data for the visual translation system 800. The storage manager 808 can maintain data of any type, size, or kind as necessary to perform the functions of the visual translation system 800. The storage manager 808, as shown in FIG. 8, includes input data 814 and training data 816. The input data 814 can include data received by the visual translation system 800 as inputs from a computing device. The input data 814 can include a video input, an image input, a 3D render, or any other suitable input to be translated by the trained image translation network 804 from a source visual domain to a target visual domain. The training data 816 can include data used to train the image translation network 804 to translate images from a source visual domain to the target visual domain. The training data 816 can include at least one pair of keyframes, where each pair of keyframes includes an image in a source visual domain and a stylized version of the image in the target visual domain (e.g., with stylizations generated by a user), and at least one unpaired image.

Each of the components 802-808 of the visual translation system 800 and their corresponding elements (as shown in FIG. 8) may be in communication with one another using any suitable communication technologies. It will be recognized that although components 802-808 and their corresponding elements are shown to be separate in FIG. 8, any of components 802-808 and their corresponding elements may be combined into fewer components, such as into a single facility or module, divided into more components, or configured into different components as may serve a particular embodiment.

The components 802-808 and their corresponding elements can comprise software, hardware, or both. For example, the components 802-808 and their corresponding elements can comprise one or more instructions stored on a computer-readable storage medium and executable by processors of one or more computing devices. When executed by the one or more processors, the computer-executable instructions of the visual translation system 800 can cause a client device and/or a server device to perform the methods described herein. Alternatively, the components 802-808 and their corresponding elements can comprise hardware, such as a special purpose processing device to perform a certain function or group of functions. Additionally, the components 802-808 and their corresponding elements can comprise a combination of computer-executable instructions and hardware.

Furthermore, the components 802-808 of the visual translation system 800 may, for example, be implemented as one or more stand-alone applications, as one or more modules of an application, as one or more plug-ins, as one or more library functions or functions that may be called by other applications, and/or as a cloud-computing model. Thus, the components 802-808 of the visual translation system 800 may be implemented as a stand-alone application, such as a desktop or mobile application. Furthermore, the components 802-808 of the visual translation system 800 may be implemented as one or more web-based applications hosted on a remote server. Alternatively, or additionally, the components of the visual translation system 800 may be implemented in a suit of mobile device applications or "apps." To illustrate, the components of the visual translation system 800 may be implemented in an image or video editing application, including but not limited to ADOBE® PHOTOSHOP®, ADOBE® PREMIERE® PRO, etc., or a cloud-based suite of applications such as CREATIVE CLOUD®. "ADOBE®," "PHOTOSHOP®," "ADOBE PREMIERE®,"

and "CREATIVE CLOUD®" are either a registered trademark or trademark of Adobe Inc. in the United States and/or other countries.

Figure 9:
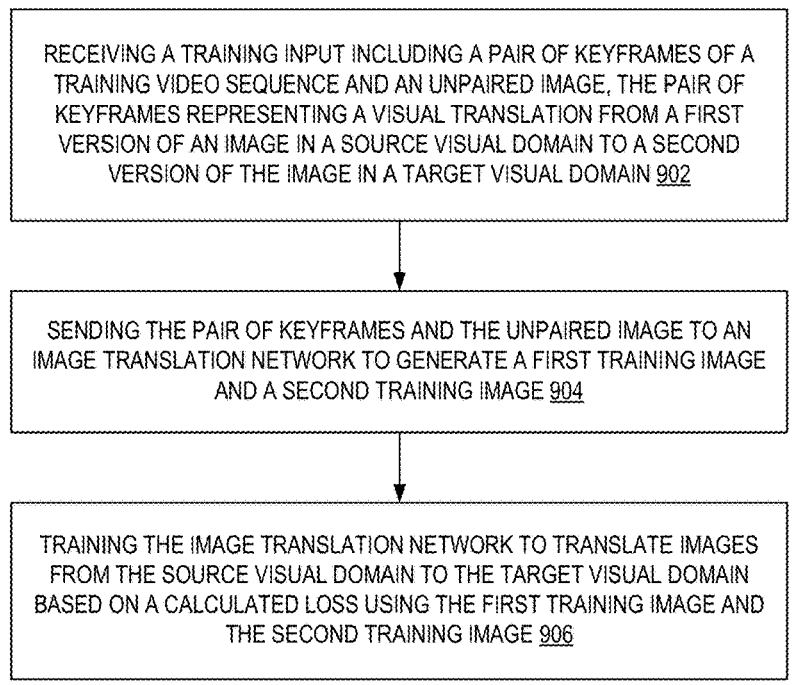
FIG. 9 illustrates a flowchart of a series of acts in a method of training an image translation network to perform visual translations from a source visual domain to a target visual domain in accordance with one or more embodiments.
Figure 10:
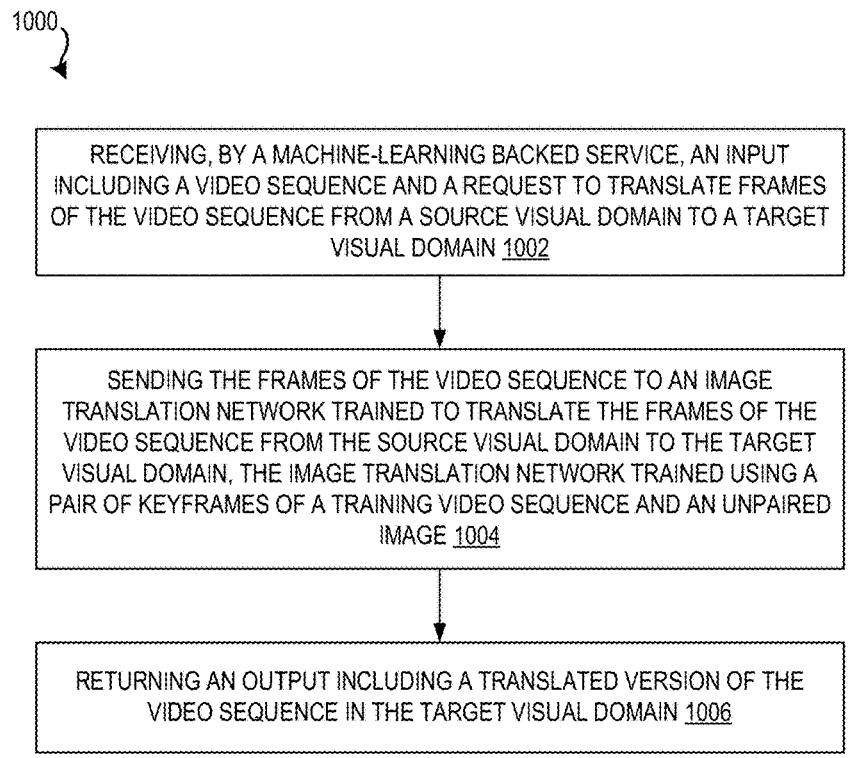
FIG. 10 illustrates a flowchart of a series of acts in a method of performing visual translations from a source visual domain to a target visual domain in accordance with one or more embodiments.

FIGS. 1-8, the corresponding text, and the examples, provide a number of different systems and devices that allows a visual translation system to translate images from a source visual domain to a target visual domain using a trained image translation network. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method of training an image translation network to perform visual translations from a source visual domain to a target visual domain in accordance with one or more embodiments. In one or more embodiments, the method 900 is performed in a digital medium environment that includes the visual translation system 800. The method 900 is intended to be illustrative of one or more methods in accordance with the present disclosure and is not intended to limit potential embodiments. Alternative embodiments can include additional, fewer, or different steps than those articulated in FIG. 9.

As shown in FIG. 9, the method 900 includes an act 902 of receiving, by a visual translation system, a training input including a pair of keyframes of a training video sequence and an unpaired image, the pair of keyframes representing a visual translation from a first version of an image in a source visual domain to a second version of the image in a target visual domain. For example, the visual translation system receives the training input from a user via a computing device or from a memory or storage location. The second version of the image in the target visual domain may be a stylized version of the image (e.g., modified by a user from the source visual domain). The unpaired image can be an image frame from a same video sequence as the image or an image frame from a similar visual domain as the image (e.g., images with similar illumination conditions, and image frame from a same video sequence as the source image 206, an image taken at a same location as the image, etc.). In one or more embodiments, the training input can include multiple keyframe and multiple unpaired imaged that can be fed to the visual translation system in parallel or in series.

As shown in FIG. 9, the method 900 also includes an act 904 of sending, by the visual translation system, the pair of keyframes and the unpaired image to an image translation network to generate a first training image and a second training image.

As shown in FIG. 9, the method 900 also includes an act 906 of training the image translation network to translate images from the source visual domain to the target visual domain based on a calculated loss using the first training image and the second training image. In one or more embodiments, training the image translation network includes concurrently generating a first training image for the first version of the image by translating the first version of the image from the source visual domain to the target visual domain and generating a second training image for the unpaired image by translating the unpaired image from the source visual domain to the target visual domain.

In one or more embodiments, the image translation network generates the second training image by analyzing the unpaired image to identify contents of the unpaired image, analyzing the second version of the image from the pair of keyframes to identify a visual style of the second version of the image, and applying the visual style of the second version of the image to the contents of the unpaired image.

In one or more embodiments, training the image translation network also includes sending the outputs (e.g., the first training image and the second training image) to loss functions. For example, the image translation network can send the first training image to a first loss function (e.g., an $L_1$ loss function) to determine a first loss based on a comparison of the first training image and the second version of the image from the pair of keyframes. The first loss function minimizes a sum of the absolute differences between the first training image and the second version of the image from the pair of keyframes. The image translation network can also send the second training image to a second loss function (e.g., a gram matrix matching loss or VGG loss function) to determine a second loss based on a comparison of the second training image and the second version of the image from the pair of keyframes. The second loss function measures a visual consistency between the second training image and the second version of the image from the pair of keyframes. The first loss and the second loss can then be combined and backpropagated to the image translation network.

FIG. 10 illustrates a flowchart of a series of acts in a method of performing visual translations from a source visual domain to a target visual domain in accordance with one or more embodiments. In one or more embodiments, the method 1000 is performed in a digital medium environment that includes the visual translation system 800. The method 1000 is intended to be illustrative of one or more methods in accordance with the present disclosure and is not intended to limit potential embodiments. Alternative embodiments can include additional, fewer, or different steps than those articulated in FIG. 10.

As shown in FIG. 10, the method 1000 includes an act 1002 of receiving, by a machine-learning backed service, an input including a video sequence and a request to translate frames of the video sequence from a source visual domain to a target visual domain. In some embodiments, the machine-learning backed service may be a web service, or other application, configured to receive requests over one or more networks (e.g., the Internet). For example, a machine-learning backed service may be a web service or other application that uses machine learning techniques to perform one or more requested actions. In some embodiments, the request may be received from an application executing on a client computing device, such as an audio editing application, web browser, or other application.

As shown in FIG. 10, the method 1000 also includes an act 1004 of sending, by the machine-learning backed service, the frames of the video sequence to an image translation network trained to translate the frames of the video sequence from the source visual domain to the target visual domain, the image translation network trained using a pair of keyframes of a training video sequence and an unpaired image. One or more machine learning techniques may be used to translate the frames of the video sequence from the source visual domain to the target visual domain.

In some embodiments, training the image translation network includes concurrently generating a first training image for the first version of the image by translating the first version of the image from the source visual domain to the target visual domain and generating a second training image for the unpaired image by translating the unpaired image from the source visual domain to the target visual domain.

As shown in FIG. 10, the method 1000 also includes an act 1006 of returning, by the machine-learning backed service, an output including a translated version of the video sequence in the target visual domain. In one or more embodiments, the machine-learning backed service sends the translated video sequence to a client computing device which originated the request or to another computing device. In one or more embodiments, the machine-learning backed service stores the translated video sequence in a memory or storage location.

Figure 11:
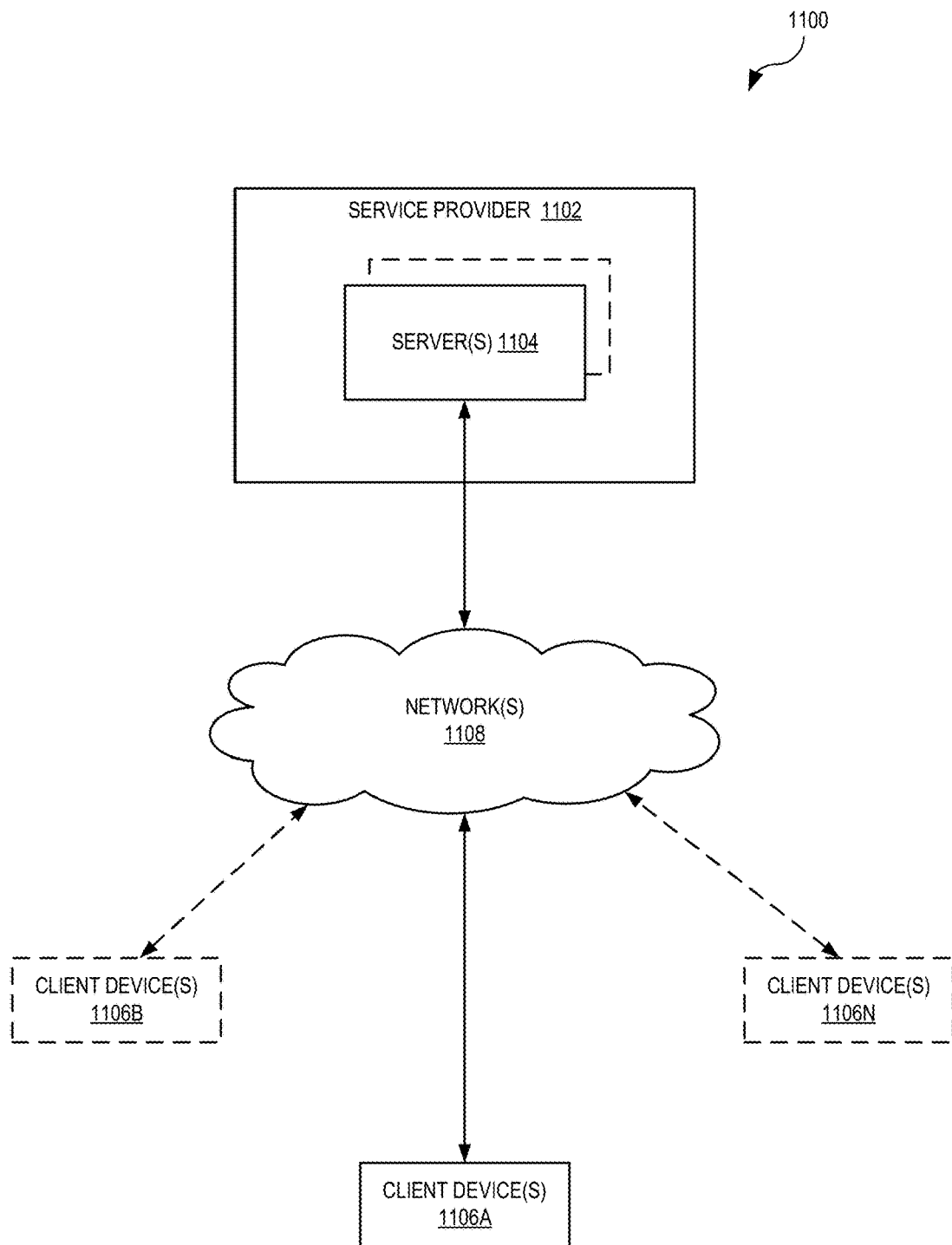
FIG. 11 illustrates a schematic diagram of an exemplary environment in which the visual translation system can operate in accordance with one or more embodiments.

FIG. 11 illustrates a schematic diagram of an exemplary environment 1100 in which the visual translation system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the visual translation system 800. In particular, the visual translation system 800 may be implemented in whole or in part on the client device 1106A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regards to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regards to FIG. 12.

In addition, the environment 1100 may also include one or more servers 1104. The one or more servers 1104 may generate, store, receive, and transmit any type of data, including input data 814, training data 816, or other information. For example, a server 1104 may receive data from a client device, such as the client device 1106A, and send the data to another client device, such as the client device 1106B and/or 1106N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the visual translation system 800. In particular, the visual translation system 800 can comprise an application running on the one or more servers 1104 or a portion of the visual translation system 800 can be downloaded from the one or more servers 1104. For example, the visual translation system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide a user of the client device 1106A with an interface to provide an input (e.g., images, video sequences, 3D render data, etc.), or an interface to select a portion of a document including images, video sequences, or 3D render data. Upon receiving the input, the one or more servers 1104 can automatically perform the methods and processes described above to translate images from a source visual domain to a target visual domain. The one or more servers 1104 can provide an output including the translated images to the client device 1106A for display to the user.

As just described, the visual translation system 800 may be implemented in whole, or in part, by the individual elements 1102-1108 of the environment 1100. It will be appreciated that although certain components of the visual translation system 800 are described in the previous examples with regards to particular elements of the environment 1100, various alternative implementations are possible. For instance, in one or more embodiments, the visual translation system 800 is implemented on any of the client devices 1106A-1106N. Similarly, in one or more embodiments, the visual translation system 800 may be implemented on the one or more servers 1104. Moreover, different components and functions of the visual translation system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model For enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
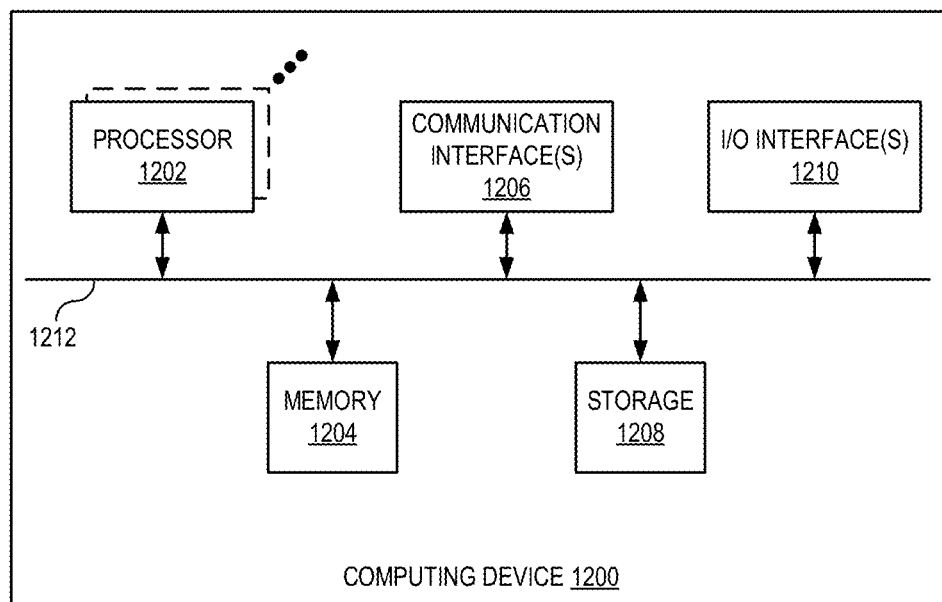
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the visual translation system 800. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
receiving a training input including a pair of keyframes of a training video sequence and an unpaired image of the training video sequence, the pair of keyframes representing a visual translation of an image, wherein a first keyframe in the pair of keyframes is a first version of the image in a source visual domain and a second keyframe in the pair of keyframes is a second version of the image in a target visual domain, and wherein the unpaired image is in the source visual domain;
generating, by an image translation network, a first training image from the first version of the image and a second training image from the unpaired image, wherein the first training image and the second training image are generated in the target visual domain based on the second version of the image; and
training the image translation network to translate images from the source visual domain to the target visual domain based on a calculated loss using the first training image and the second training image.

2. The computer-implemented method of claim 1, wherein generating the first training image from the first version of the image and the second training image from the unpaired image comprises:
generating the first training image for the first version of the image by translating the first version of the image from the source visual domain to the target visual domain; and
generating the second training image for the unpaired image by translating the unpaired image from the source visual domain to the target visual domain.

3. The computer-implemented method of claim 1, wherein the image translation network is configured to generate the second training image by:
analyzing the unpaired image to identify contents of the unpaired image;
analyzing the second version of the image from the pair of keyframes to identify a visual style of the second version of the image; and
applying the visual style of the second version of the image to the contents of the unpaired image.

4. The computer-implemented method of claim 1, wherein training the image translation network based on the calculated loss comprises:
calculating, using a first loss function, a first loss of the first training image and the second version of the image from the pair of keyframes;
calculating, using a second loss function, a second loss of the second training image and the second version of the image from the pair of keyframes; and
determining the calculated loss from the first loss and the second loss.

5. The computer-implemented method of claim 4, wherein calculating the first loss of the first training image and the second version of the image from the pair of keyframes comprises:
minimizing a sum of the absolute differences between the first training image and the second version of the image from the pair of keyframes.

6. The computer-implemented method of claim 4, wherein calculating the second loss of the second training image and the second version of the image from the pair of keyframes comprises:
measuring a visual consistency between the second training image and the second version of the image from the pair of keyframes.

7. The computer-implemented method of claim 1, further comprising:
receiving an input including a video sequence and a request to translate frames of the video sequence from the source visual domain to the target visual domain;
sending the frames of the video sequence to the trained image translation network to translate the frames of the video sequence from the source visual domain to the target visual domain; and
returning an output including a translated version of the video sequence in the target visual domain.

8. The computer-implemented method of claim 1, further comprising:
receiving a second training input including a second pair of keyframes of a source image and a second unpaired image, the second pair of keyframes of the source image representing a visual translation of the source image, wherein a third keyframe in the second pair of keyframes is a first version of a portion of the source image in a second source visual domain and a fourth keyframe in the second pair of keyframes is a second version of the portion of the source image in a second target visual domain, and wherein the second unpaired image is in the source visual domain;
generating, by the image translation network, a third training image from the first version of the portion of the source image and a fourth training image from the second unpaired image, wherein the third training image and the fourth training image are generated in the second target visual domain based on the second version of the portion of the source image; and
training the image translation network to translate images from the second source visual domain to the second target visual domain based on a calculated loss using the third training image and the fourth training image.

9. A non-transitory computer-readable storage medium including instructions stored thereon which, when executed by at least one processor, cause the at least one processor to:
receive a training input including a pair of keyframes of a training video sequence and an unpaired image of the training video sequence, the pair of keyframes representing a visual translation of an image, wherein a first keyframe in the pair of keyframes is a first version of the image in a source visual domain and a second keyframe in the pair of keyframes is a second version of the image in a target visual domain, and wherein the unpaired image is in the source visual domain;
generating, by an image translation network, a first training image from the first version of the image and a second training image from the unpaired image, wherein the first training image and the second training image are generated in the target visual domain based on the second version of the image; and
train the image translation network to translate images from the source visual domain to the target visual domain based on a calculated loss using the first training image and the second training image.

10. The non-transitory computer-readable storage medium of claim 9, wherein generating the first training image from the first version of the image and the second training image from the unpaired image comprises:
generating the first training image for the first version of the image by translating the first version of the image from the source visual domain to the target visual domain; and
generating the second training image for the unpaired image by translating the unpaired image from the source visual domain to the target visual domain.

11. The non-transitory computer-readable storage medium of claim 9, wherein the image translation network is configured to generate the second training image by:
analyzing the unpaired image to identify contents of the unpaired image;
analyzing the second version of the image from the pair of keyframes to identify a visual style of the second version of the image; and
applying the visual style of the second version of the image to the contents of the unpaired image.

12. The non-transitory computer-readable storage medium of claim 9, wherein training the image translation network based on the calculated loss comprises:
calculating, using a first loss function, a first loss of the first training image and the second version of the image from the pair of keyframes;
calculating, using a second loss function, a second loss of the second training image and the second version of the image from the pair of keyframes; and determining the calculated loss from the first loss and the second loss.

13. The non-transitory computer-readable storage medium of claim 12, wherein calculating the first loss of the first training image and the second version of the image from the pair of keyframes comprises:
   minimizing a sum of the absolute differences between the first training image and the second version of the image from the pair of keyframes.

14. The non-transitory computer-readable storage medium of claim 12, wherein calculating the second loss of the second training image and the second version of the image from the pair of keyframes comprises:
   measuring a visual consistency between the second training image and the second version of the image from the pair of keyframes.

15. The non-transitory computer-readable storage medium of claim 9, further comprising:
   receiving an input including a video sequence and a request to translate frames of the video sequence from the source visual domain to the target visual domain;
   sending the frames of the video sequence to the trained image translation network to translate the frames of the video sequence from the source visual domain to the target visual domain; and
   returning an output including a translated version of the video sequence in the target visual domain.

16. The non-transitory computer-readable storage medium of claim 9, further comprising:
   receiving a second training input including a second pair of keyframes of a source image and a second unpaired image, the second pair of keyframes of the source image representing a visual translation of the source image, wherein a third keyframe in the second pair of keyframes is a first version of a portion of the source image in a second source visual domain and a fourth keyframe in the second pair of keyframes is a second version of the portion of the source image in a second target visual domain, and wherein the second unpaired image is in the source visual domain;
   generating, by the image translation network, a third training image from the first version of the portion of the source image and a fourth training image from the second unpaired image, wherein the third training image and the fourth training image are generated in the second target visual domain based on the second version of the portion of the source image; and
   training the image translation network to translate images from the second source visual domain to the second target visual domain based on a calculated loss using the third training image and the fourth training image.

17. A computer-implemented method comprising:
   receiving, by a machine-learning backed service, an input including a video sequence and a request to translate frames of the video sequence from a source visual domain to a target visual domain;
   sending the frames of the video sequence to an image translation network trained to translate the frames of the video sequence from the source visual domain to the target visual domain, the image translation network trained by generating training images in a target visual domain from a training input that includes a pair of keyframes of a training video sequence and an unpaired image of the training video sequence, the pair of keyframes representing a visual translation of an image, wherein a first keyframe in the pair of keyframes is a first version of the image in a source visual domain and a second keyframe in the pair of keyframes is a second version of the image in the target visual domain, wherein the unpaired image is in the source visual domain; and
   returning an output including a translated version of the video sequence in the target visual domain.

18. The computer-implemented method of claim 17, wherein the image translation network is trained using a training system configured to:
   generate, by the image translation network, a first training image from the first version of the image and a second training image from the unpaired image, wherein the first training image and the second training image are generated in the target visual domain based on the second version of the image; and
   train the image translation network to translate images from the source visual domain to the target visual domain based on a calculated loss using the first training image and the second training image.

19. The computer-implemented method of claim 18, wherein training the image translation network based on the calculated loss comprises:
   generating the first training image for the first version of the image by translating the first version of the image from the source visual domain to the target visual domain; and
   generating the second training image for the unpaired image by translating the unpaired image from the source visual domain to the target visual domain.

20. The computer-implemented method of claim 18, wherein the image translation network is configured to generate the second training image for the unpaired image by:
   analyzing the unpaired image to identify contents of the unpaired image;
   analyzing the second version of the image from the pair of keyframes to identify a visual style of the second version of the image; and
   applying the visual style of the second version of the image to the contents of the unpaired image.

* * * * *